United States Patent [19]

Tomita

[11] Patent Number: 5,723,193
[45] Date of Patent: Mar. 3, 1998

[54] INFORMATION RECORDING DISK AND RECORDED INFORMATION REPRODUCING APPARATUS

[75] Inventor: Yoshimi Tomita, Tsurugashima, Japan

[73] Assignee: Pioneer Electronic Corporation, Tokyo, Japan

[21] Appl. No.: 65,425

[22] Filed: May 24, 1993

[30] Foreign Application Priority Data

Jun. 2, 1992 [JP] Japan .................... 4-141634

[51] Int. Cl.$^6$ ........................ G11B 5/66
[52] U.S. Cl. ............ 428/65.3; 428/64.4; 428/694 R; 428/694 ML; 428/694 SC; 428/694 MT; 428/694 T; 428/900; 428/694 TR; 428/141
[58] Field of Search ................... 428/64.4, 65.3, 428/141, 694 R, 694 TR, 694 ML, 694 SC, 694 MT, 694 T, 900

[56] References Cited

U.S. PATENT DOCUMENTS

| | | | |
|---|---|---|---|
| 5,008,176 | 4/1991 | Kondo | 430/270.11 |
| 5,380,573 | 1/1995 | Fukumoto | 428/64.3 |
| 5,419,939 | 5/1995 | Arioka | 428/65.3 |
| 5,487,926 | 1/1996 | Kuribayashi | 428/33 |
| 5,556,681 | 9/1996 | Matsuzawa | 428/64.1 |
| 5,582,896 | 12/1996 | Kuwamoto | 428/141 |

*Primary Examiner*—Leszek Kiliman
*Attorney, Agent, or Firm*—Evenson, McKeown, Edwards & Lenahan, PLLC

[57] ABSTRACT

An object of this invention is to provide an information recording disk which allows a higher information recording density as compared with that of a conventional disk and a recorded information reproducing apparatus for reproducing information recorded therein. On the information recording disk, plurality of pits corresponding to information are formed, and furthermore a magnetic thin film is formed from soft magnetic material such as pure iron, silicon steel, permalloy, or Mn-Zn ferrite and so on.

6 Claims, 1 Drawing Sheet

INFORMATION RECORDING DISK AND RECORDED INFORMATION REPRODUCING APPARATUS

BACKGROUND OF THE INVENTION

1. Field of the Invention

This invention relates to an information recording disk in which information is recorded as a predetermined form, and a recorded information reproducing apparatus for reproducing information recorded therein by detecting a pit in the information recording disk.

2. Description of the Related Art

As a method for detecting a pit formed as recorded information in a ROM type of information recording disk, the method is well-known in which a spot beam is irradiated from an optical system including a light source to the disk and a reflected light therefrom which includes the information about the pit is received to detect whether the pit is present or not.

In detection of the pit by making use of light, however, because of restrictions over wavelength of the spot beam and numerical aperture of lens in the optical system, the width and length of the pit is required to be large, so that there is a limit in raising a density of pits formed in a disk, namely an information recording density.

SUMMARY OF THE INVENTION

A main object of the present invention is to provide an information recording disk in which the information recording density can be raised.

Another object of the present invention is to provide a recorded information reproducing apparatus which can reproduce information recorded in the information recording disk at a high density.

The information recording desk according to the present invention having a recording surface on which plurality of pits corresponding to information are formed, comprises a magnetic thin film formed over said recording surface.

Furthermore, a recorded information reproducing apparatus comprises a magnetic head having a core with a projection and a coil wound around said projection, said projection having a surface which faces a recording surface of an information recording disk, and a current supply means for supplying current flow to said coil, whereby a pit in said information recording disk can be detected according to the output appearing between the two ends of the coil.

The information recording disk according to the present invention has a magnetic thin film on the recording surface so that a magnetic circuit can be produced passing through the core, the magnetic head and the magnetic thin film.

In the recorded information reproducing apparatus according to the present invention, when a current flow is supplied to the coil wound around the projection of the core in the magnetic head having a surface which faces a recording surface of a information recording disk, a magnetic resistance of the magnetic circuit changes in response to whether a pit is present or not. Accordingly, recording density of information to be recorded in the information recording disk can be raised.

DETAILED DESCRIPTION OF THE PREFERRED EMBODIMENTS

Figure 1:
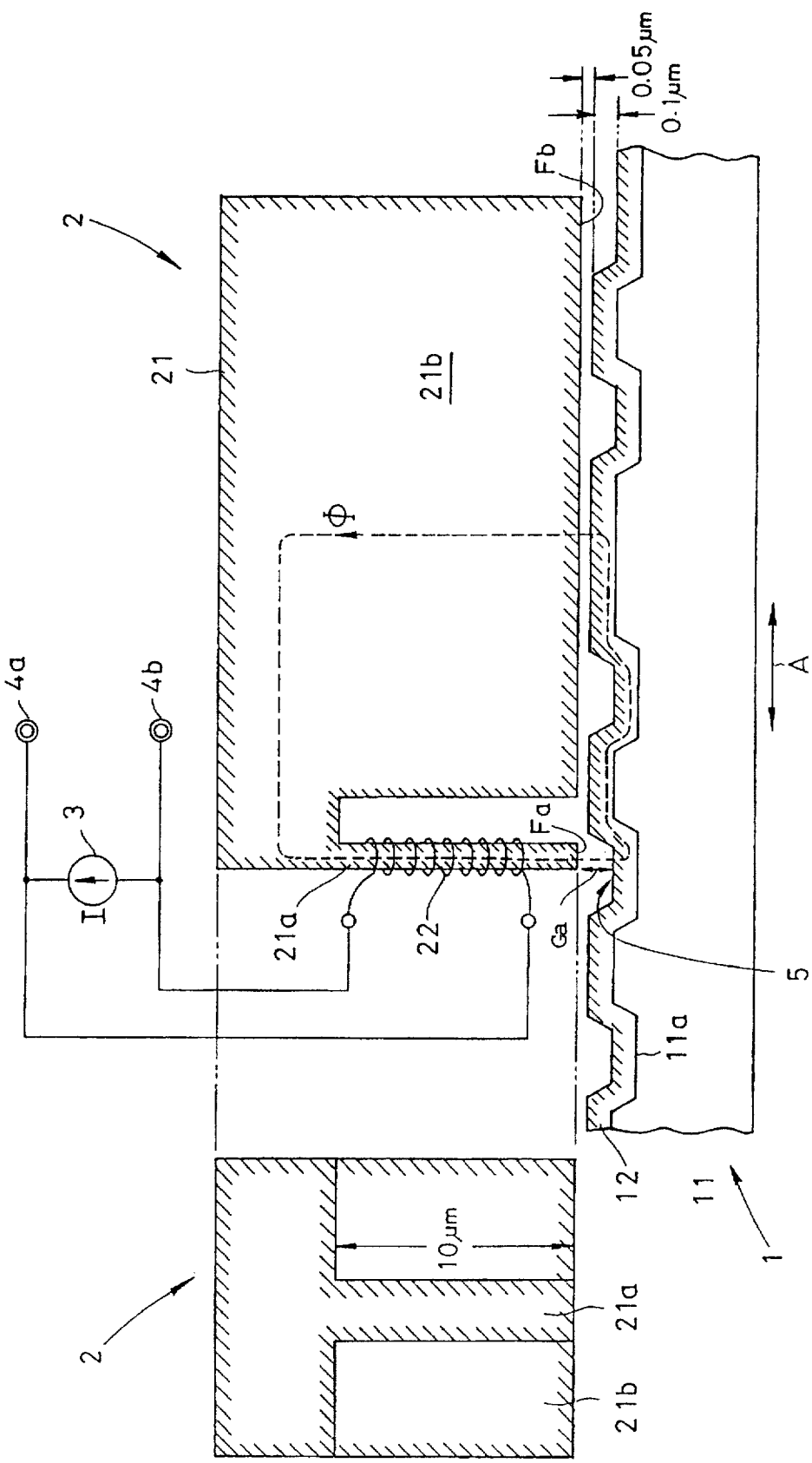
FIG. 1 is a diagram showing a information recording disk and a recorded information reproducing apparatus thereof according to the present invention.

In order to more clearly and in more details describe the objects, structure and advantages of the present invention as described above will become more apparent when reference is made to the following description taken in conjunction with the accompanying drawings.

FIG. 1 shows an information recording disk, which is one embodiment of the present invention, and a recorded information reproducing apparatus thereof.

Referring to FIG. 1, a disk 1 comprises a substrate which has plurality of bits as recorded information formed on one surface and a soft magnetic thin film 12 made from, for example, pure iron, silicon steel, permalloy, or Mn-Zn ferrite on a recording surface 11a.

A magnetic head 2 for reading recorded pit On said disk 1 is mounted above the disk 1 and with a space of approx. 0.05 μm from the soft magnetic thin film 12. The magnetic head 2 comprises a core 21 forming a magnetic circuit and a coil 22 formed by winding a conducting wire around a main pole section 21a of the core 21. The core 21 comprises a body section 21b and a main pole section 21a which projects from the body section 21b and formed with a length of substantially 10 μm by means of the thin film head forming technology. The body section 21b has a surface Fb which has an area substantially larger than a cross section (a surface Fa facing the disk 1) of the main pole 21a. The two ends of the coil 22 are connected to output terminals of a constant current supply respectively and connected to read signal output terminals 4a and 4b. The arrow sign A shows the direction of the disk track, and the left side of the figure is the front view of the main pole section 21a in magnetic head 2.

In the system described above, when a DC current is supplied by a constant current supply 3 to the coil 22, a magnetic circuit is formed with a magnetic flux Φ indicated by a dotted line in the figure because the maximum magnetic permeability Of the soft magnetic thin film 12 formed on the recording surface of the disk 1 is large and its hysteresis loss is small. It should be noticed, however, that the flux Φ shown in the figure indicates only its direction. In other words, the flux generated in the magnetic head 2 passes through the surface Fa of the main pole section 21, which faces the disk, and a soft magnetic thin film at pit 5 and then flows to the surface Fb of the body section 21b, which faces the disk, so that a magnetic loop is formed.

Now, assuming that the disk 1 is rotated by a driving system (not shown) in the direction shown by the arrow sign A, when the main pole section 21a scans on a track having pit arrays on the disk 1, the gap Ga between the surface Fa facing the disk and a recording surface of the disk 1 i.e. the surface of the soft magnetic thin film 12 changes in response to whether a pit is present or not. In accompany with the change of this gap Ga, the magnetic resistance of the entire magnetic circuit comprising the disk 1 and the magnetic head 2 also changes.

Herein, assuming that the magnetic resistance of the entire magnetic disk is Rt (t: total), the magnetic resistance Rt of the entire magnetic circuit is indicated by the following equation (1).

$$Rt = Rmp + Rfg + Rbg + Rd \tag{1}$$

In equation (1), Rmp (mp: main pole) is a magnetic resistance of the main pole section 21a, Rfg (fg: forward gap) is a magnetic resistance between the surface of the main pole 21a facing a disk and the surface of the soft magnetic thin film 12, Rbg (bg: backward gap) is a magnetic resistance between the surface of the body section 21b facing a disk and the surface of the soft magnetic thin film 12, and Rd (d:disk) is a magnetic resistance of the soft magnetic thin film 12 of the disk 1.

In order to cause the total magnetic resistance Rt to change only due to change of the magnetic resistance Rfg which changes in response to a distance between the main pole section, which has a detecting means, and the disk, it is necessary to reduce the other magnetic resistances Rmp, Rbg and Rd as compared with the magnetic resistance Rfg. Values of the magnetic resistances Rmp and Rd are very small, because the magnetic permeability $\mu$ of the material is larger than 500. As regards the magnetic resistance Rbg, its magnetic permeability is the same as that of the magnetic resistance Rfg. For this reason, the magnetic resistance Rbg can be reduced to a considerably smaller value as compared to the magnetic resistance Rfg. In other words, the gap between a surface facing a disk and a soft magnetic thin film and their magnetic permeability are the same as those of the section which causes the magnetic resistance Rfg, so that the magnetic resistance Rbg can be reduced to a considerably small value by increasing the area of a surface facing a disk to 500 times or more larger one like the permeability. Accordingly, it may be noted that the area Sbg of a surface of the body section 21b facing a disk is enough in case that it satisfies the following condition in relation to the area Sfg of a surface of the main pole section 21a facing a disk:

$$Sbg=500\ Sfg \qquad (2)$$

For example, if a relative magnetic permeability is substantially 10,000, a ratio of the total magnetic resistance of a section where a pit exists to that of a place where a pit does not exist is 3:1. It should be noted that, as described above, the magnetic resistances of the soft magnetic thin film 12 and a gap between the surface Fb of the body section facing a disk and the soft magnetic thin film 12 are small to be ignored, and in addition, an area of said surface Fb facing a disk is considerably large, so that any change generated by the surface Fb's scanning a pit array which is unnecessary for detection gives basically no influence over a magnetic resistance of the entire magnetic circuit.

Then, as magnetic flux in said magnetic circuit changes accordance with change of the magnetic resistance, a voltage corresponding to whether a pit is present or not appears between terminals 4a and 4b. The appearing voltage also depends on such factors as a number of turns of the coil 22 and a level of DC current I, so that an adequate S/N value of the output voltage can be obtained by setting an suitable value for each factor respectively.

The size of the magnetic head 2 described above is determined by a precision of machining. Furthermore, the size of the main pole section 21a can be reduced to an ordinary light spot diameter, so that even a pit, which is smaller than a conventional pit, can be detected. Accordingly, also the size of the pit formed on the disk 1 can be reduced to a smaller one as compared to the conventional pits, and improvement of the information recording density can be achieved.

It should be noted that the above description of the preferred embodiments describes the case in which the soft magnetic thin film is formed on a recording surface of the disk, the present invention is not limited by the above embodiment, and the same advantages can be achieved even if any other type of magnetic thin film is formed on the disk.

What is claimed is:

1. An information recording magnetic disk for recording information signals on a recording surface, said information signals being reproduced by a reproducing apparatus, said disk comprising:

a plurality of pits formed, in a disk track direction, on the recording surface, each of said pits corresponding to a respective information signal; and a magnetic thin film formed on said recording surface covering said plurality of pits, wherein said magnetic thin film constitutes a portion of a closed magnetic circuit for detecting a pit formed on the recording surface.

2. An information recording magnetic disk according to claim 1, wherein said magnetic thin film is made of soft magnetic material.

3. An information recording magnetic disk according to claim 2, wherein said soft magnetic material is manganese-zinc (Mn-Zn) ferrite.

4. An information recording magnetic disk according to claim 2, wherein said soft magnetic material is pure iron.

5. An information recording magnetic disk according to claim 2, wherein said soft magnetic material is silicon steel.

6. An information recording magnetic disk according to claim 2, wherein said soft magnetic material is permalloy.

* * * * *